(12) United States Patent
Reddy et al.

(10) Patent No.: US 8,715,767 B2
(45) Date of Patent: *May 6, 2014

(54) LOW-CALORIE, LOW-FAT SNACK NUTS

(71) Applicant: APPTEC, Inc., Cranbury, NJ (US)

(72) Inventors: Vilambi N R K Reddy, Cranbury, NJ (US); Anil Torgalkar, Cranbury, NJ (US); Lionel Xavier, TamilNadu (IN)

(73) Assignee: APPTEC, Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,304

(22) Filed: Jul. 12, 2013

(65) Prior Publication Data

US 2013/0302503 A1 Nov. 14, 2013

Related U.S. Application Data

(60) Continuation-in-part of application No. 13/589,104, filed on Aug. 18, 2012, now abandoned, which is a division of application No. 13/314,124, filed on Dec. 7, 2011, now Pat. No. 8,445,054, which is a continuation-in-part of application No. 13/200,580, filed on Sep. 26, 2011, now abandoned.

(51) Int. Cl.
*A23L 1/36* (2006.01)

(52) U.S. Cl.
USPC .......................................... 426/632

(58) Field of Classification Search
None
See application file for complete search history.

(56) References Cited

U.S. PATENT DOCUMENTS

| | | | |
|---|---|---|---|
| 2,003,415 A | 6/1935 | Ammann | |
| 3,294,549 A * | 12/1966 | Vix et al. | 426/632 |
| 3,645,752 A | 2/1972 | Baxley | |
| 4,049,833 A | 9/1977 | Gannis et al. | |
| 4,329,375 A | 5/1982 | Holloway | |
| 4,466,987 A | 8/1984 | Wilkins et al. | |
| 4,938,987 A | 7/1990 | Gannis et al. | |
| 5,002,802 A | 3/1991 | Gannis et al. | |
| 5,094,874 A | 3/1992 | Zook | |
| 5,164,217 A | 11/1992 | Wong et al. | |
| 5,240,726 A | 8/1993 | Zook et al. | |
| 5,290,578 A | 3/1994 | Passey et al. | |
| 5,595,780 A | 1/1997 | Zook | |
| 2002/0068122 A1 | 6/2002 | Hathi | |

FOREIGN PATENT DOCUMENTS

WO    WO 91/10372    7/1991

OTHER PUBLICATIONS

National Nutrient Database for Standard Reference Release 25.Nutrient data for 16095, Peanuts, virginia, raw. accessed Jan. 11, 2013.*
ASTM Standard Test Method for Rubber Property—Durometer Hardness (Designation: D2240—05, Reapproved 2010), p. 10.*
Yudi Pranato, Djagal Wiseso Marseno and Haryadi, "Methylcellulose and hydroxyprophyl methylcellulose-based coatings on partially defatted peanut to reduce frying oil uptake and enhance oxidative stability," As. J. Food Ag-Ind., 2009 2(04), 891-900.
The University of Georgia, College of Agricultural and Environmental Sciences, "Development of Spicy Meat Analogs and Technology Transfer of Value-added Products From Peanuts," p. 1.
APPTEC, Inc., Company Marketing Brochure for Nachalur Natural Reduced Fat, Reduced Calorie Peanuts, which contains consumer survey data.
List of current distributors for Nachalur Natural Reduced Fat, Reduced Calorie Peanuts.

* cited by examiner

*Primary Examiner* — Humera Sheikh
*Assistant Examiner* — Subbalakshmi Prakash
(74) *Attorney, Agent, or Firm* — Stanley H. Kremen

(57) ABSTRACT

The Present Invention is an uncoated reduced fat, high fiber, high protein, and low calorie roasted snack peanut. The uncoated snack peanuts are manufactured using a physical process comprising expelling the oil from nutmeat kernels (defatting) using a novel pressing process that takes less than a minute. The defatting process deforms the nuts. The peanuts are reformed to their original shape using water. Then the reformed nuts are annealed using cold water to produce hardened nuts. The peanuts are then dried and roasted using state-of-the-art technology. Prior art processes that expel the oil from nuts and reconstitute them produce nuts that easily break and flake. Most of these nuts have an undesirable taste. By contrast, the uncoated, defatted peanuts of the Present Invention have hardness, texture, taste, aroma, and a physical appearance closely approximating that of natural nuts. The shelf life is improved relative to the prior art processes.

6 Claims, 2 Drawing Sheets

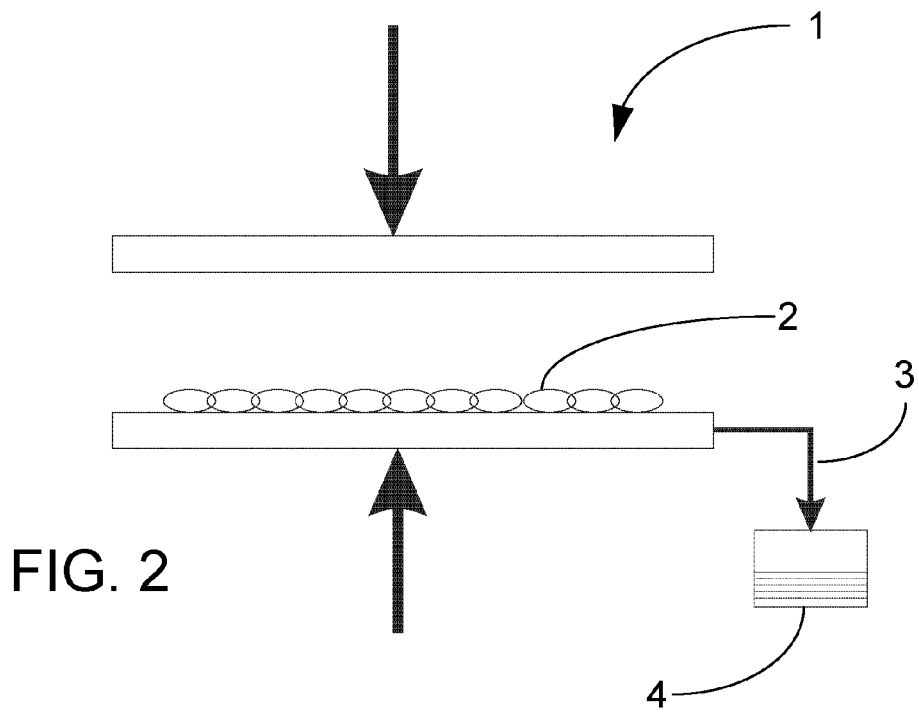
FIG. 2
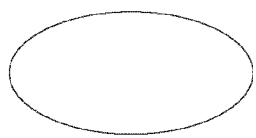  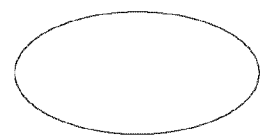
FIG. 3A    FIG. 3B    FIG. 3C
FIG. 3

LOW-CALORIE, LOW-FAT SNACK NUTS

CROSS REFERENCE TO RELATED APPLICATIONS

This Present application is a continuation-in-part (CIP) of currently pending U.S. patent application Ser. No. 13/589,104 (the '104 application) filed on Aug. 18, 2012, which in turn is a division of U.S. patent application Ser. No. 13/314,124 (the '124 application) filed on Dec. 7, 2011 (now issued as U.S. Pat. No. 8,445,054 on May 21, 2013), which in turn is a continuation-in-part (CIP) of currently pending U.S. patent application Ser. No. 13/200,580 (the '580 application) filed on Sep. 26, 2011. The '104 application, the '124 application, and the '580 application are all incorporated by reference herein in their entirety. The Present application claims the benefit of and priority to the '104 application, the '124 application, and the '580 application.

FIELD OF THE INVENTION

The Present Invention relates to snack nutmeats (including inter alia peanuts, cashews, pistachios, pecans, walnuts, macadamia nuts, brazil nuts, hickory nuts, beechnuts, acorns, and almonds, etc.) that are lower in fat and calories and higher in protein and fiber than the original natural nuts. The process disclosed in the Present application produces the snack nuts, which are defined as whole or split nuts. The snack nuts formed by this process have a pleasing flavor, color, texture, and hardness that enable them to be used whole as a snack food and to be stacked and stored with minimal breakage.

BACKGROUND OF THE INVENTION

Nuts constitute a very popular high-protein snack food. Unfortunately, they have a high fat and calorie content. This is due to the presence of nut oil. This oil inherently permeates the nut. Peanuts have high oil content. Peanut oil represents 50 percent of the weight of the peanut, and approximately 80 percent of the calorie content. Prior art processes exist that partially remove the oil from peanuts, thereby reducing the fat and calorie content. However, there are no current commercially available snack nuts. This is due to inherent limitations present in the prior art manufacturing processes as well as the nuts produced by those processes.

Peanuts are used primarily to produce peanut butter, a most popular snack food. Nearly half of the peanuts produced in the United States are consumed as peanut butter. Peanut butter is produced from a paste of ground peanuts as a fine powder along with several other paste-forming agents. Low-fat peanut butter products are available commercially, but they do not use low fat snack nuts as a starting point.

The Present Invention does not deal with reduced fat peanut butter. Rather, it discloses low fat, low calorie snack peanuts that have virtually the same taste and texture as their high-calorie counterparts. Furthermore, the hardness of peanuts produced by the disclosed process is somewhat greater than raw peanuts. For a nut to become a snack nut, it must first be shelled. Shelling is the process that removes the outer shell covering from the nut kernel. The nut kernels may then be used as snack nuts—either whole or split. Many snack nuts then go through a blanching process where a skin covering is removed from the kernel. However, this is not always the case. Nonetheless, snack nuts either are whole nut kernels or split kernels. They never consist of ground nut kernel powders or granules.

There are two commercially feasible methods for removing oil from nuts. In the first type of process, chemical solvents may be used to absorb the oil, and the solvent with the dissolved oil is thereafter separated from the nuts. Hexane is a typical solvent used for this purpose. However, the use of organic solvents in the food industry is somewhat undesirable.

The second type of process removes nut oil by applying pressure to the nuts. The high pressure expels the oil from the nuts. Following application of pressure, the nuts are deformed. When commercial expellers designed to remove the maximum amount of oil from the nut are used, the deformed nuts are ejected as a cake. These nuts cannot be reformed to look like the natural nuts. However, oil may also be partially removed from the nuts. This process results in production of partially deformed nuts. The nuts are flattened. Therefore, the deformed nuts are reconstituted to their original familiar shape to make them commercially appealable. This is done using water. The reconstituted wet nuts are then dried and roasted.

This second type of process, which partially expels the oil from nuts by application of high pressure, has limitations that have prevented commercial viability. The key limitations include:
  Pressure is usually applied by placing the nuts into a hydraulic press. The time required for applying pressure is inordinately long, ranging from 30 minutes to two hours. This renders the process not commercially viable. Unfortunately, this factor forces the unit operation to be a batch process.
  Reforming the nuts into their original shape by reconstituting in an aqueous medium produces a low yield of nuts.
  After the reforming step, the nuts have too low hardness characteristics for post processing, thereby further decreasing the yield of reduced fat snack nuts.
  While low fat, low-calorie peanuts are produced using prior art processes, the time necessary for completion of the processes and the yield of the snack nuts mitigate against cost-effective commercialization.

Over the past quarter-century, American consumers have become very weight conscious. There is a need for a low calorie nut, especially a peanut that is low in fat. The processes that are in use today to form low calorie nuts are too slow to be viable for commercial manufacturing. In addition, the low calorie nuts formed by state of the art processes are unappealing in texture and taste, and although they may be commercially suitable for nut products, such as peanut butter or peanut oil used in cooking, they are not suitable for eating reconstituted snack nuts. The market has a compelling long-felt and unfulfilled need for an economical process to prepare low calorie, low fat snack nuts rapidly that appeal to consumers.

SUMMARY OF THE INVENTION

The Present Invention relies upon a physical process for preparing reduced-fat, high-fiber, high-protein, low-calorie roasted nuts. The process of the Present Invention exhibits lower process times and higher yields than the prior art processes. As a starting point, the nuts are shelled. This produces nut kernels. The next step is blanching, in which the skin or dried coat is removed. The blanching step is optional. Then a close-packed monolayer of nut kernels are placed in a press, held in place by applying a vacuum to the lower plate, and the oil is extracted by multiple pressing and releasing cycles during an interval of less than one minute. This releases between 20 to 50 percent of the oil from the nut in a controlled manner. The expelled oil is simultaneously removed and collected using the vacuum pump. Pressing in this manner leaves the nuts in a controlled deformed flattened state. The nuts are then reconstituted to their original shape by placing them in contact with water heated to a temperature between 176° to 212° F. Typically, this process takes less than one minute. Then, the nuts are immediately annealed (hardened) by subjecting them to cold water at a temperature ranging from 32° to 68° F. for a period of time typically less than one minute. The nuts are then dried and post-processed with coatings and roasting using state-of-the-art technology.

The yield of reduced fat snack nuts produced by the process of the Present Invention is generally greater than eighty percent. The processing time is significantly lower than that of the prior art processes, and the yields are significantly higher, and the hardness is acceptable for snacking.

DISCUSSION OF THE PRIOR ART

This section compares peanuts produced by the prior art processes found in the patent literature with that of the Present Invention. The prior art processes are discussed infra, and for each reference, the Present Invention is compared "by contrast." A person having ordinary skill in the art will comprehend these differences.

The prior art processes have not proved commercially viable. While they have been successful in producing low fat, low calorie nuts, the batch process times are too long (and therefore too costly), and in many instances, the nuts lack commercially pleasing flavor and texture. By contrast, the process of the Present Invention has proven to be commercially successful. Snack peanuts made using this process are currently being sold throughout the United States. The taste and texture of the low fat, low calorie peanuts thus produced are virtually indistinguishable from regular peanuts. The process of the Present Invention fulfills a long-felt need for a less expensive method for producing reduced fat, low calorie, high protein, and healthy diet snack nuts.

A comparative discussion of the prior art follows:

(1) U.S. Pat. No. 2,003,415 issued to Ammann on Jun. 4, 1935 (based upon a patent application filed in October 1933) teaches a process of extracting oil from peanuts by heating them to between 176° and 194° F. and applying a pressure of almost 9,000 psi for 45 minutes to one hour to remove 60 to 70% of the oil. The kernels are deformed into a cake, but are reconstituted by exposure to steam for approximately 20 to 30 minutes. According to Baxley (infra) the nuts produced by this process lack flavor. Nonetheless, Amman recited a need for defatted peanuts by consumers eighty years ago.

(2) U.S. Pat. No. 3,294,549 issued to Vix, et. al. on Dec. 27, 1966 teaches a process to partially defat nutmeats. Vix forms the basis for most of the prior art processes for defatting peanuts. The post-Vix processes concentrate primarily upon improving the quality of the defatted nuts. The process teaches removing the oil from nutmeats by mechanical pressing and, thereafter, reconstituting the distorted kernels to their general original physical size and appearance by expanding them in an aqueous vehicle. The process may use hot pressing or cold pressing. Cold pressing requires a pressure of about 2,000 psi over a period ranging from 30 minutes to 2 hours at ambient room temperature. Hot pressing uses steam to heat the kernels to a temperature ranging from 180° to 220° F. and applying a pressure of about 2,000 psi for approximately one hour. Complete reconstitution of the nut kernels to their original shape occurs between 3 and 8 minutes in an aqueous medium.

By contrast, the process of the Present Invention uses pressing times that are less than one minute. The applied pressure is less than 1,000 psi. A vacuum pump is used to remove the oil rapidly during pressing to reduce cycle time. The reconstitution time for the Present Invention is very short (less than one minute), and the process uses a cold-water step before drying to freeze the nuts and to improve processability.

(3) U.S. Pat. No. 3,645,752 issued to Baxley on Feb. 29, 1972 also teaches a process to defat peanuts. He comments on the above-mentioned U.S. Pat. Nos. 2,003,415 and 3,294,549 stating that, while the nuts are low calorie, they lack flavor and have a very short shelf life. Baxley proposes to correct these problems by drying and roasting the nuts after they are pressed and reconstituted. The succeeding two-step process includes the steps of subjecting the pressed, partially defatted nuts to an oil bath at a temperature sufficient to roast the nuts, typically in the range of 300° to 350° F., wherein the nuts return to their original shape. The nuts are then drained for a short period, such as 1 minute, and while still hot then subjected to a second oil bath in the temperature range from 130° to 140° F. During the reconstitution process, the cells that formerly contained oil are empty and subjected to vacuum. During reconstitution, the oil may contain any desired flavoring, which can then fill the voids. Baxley does not specify the pressure applied to the nuts or the time for applying pressure. By contrast, the process of the Present Invention does not include oil roasting to reconstitute the nuts.

(4) U.S. Pat. No. 4,049,833 issued to Gannis, et. al. on Sep. 20, 1977, and assigned to Nabisco, discloses a process whereby partially defatted nuts are subjected to a glycerol-containing solution until at least a portion of the solution is absorbed by the nuts during reconstitution. Gannis points out that defatted nuts have not been widely accepted by the public because they do not have a desirable texture and they do not have the flavor and storage stability of original nuts. Gannis states that, "when chewed, such products feel gritty or chalky in the mouth and produce an unsatisfactory mouth feel." By contrast, the process of the Present Invention does not use glycerol to reconstitute the nuts.

(5) U.S. Pat. No. 4,329,375 issued to Holloway on May 11, 1982, and assigned to Nabisco, discloses a somewhat different process to prepare low fat, low calorie nuts having a desirable flavor and texture. Prior to pressing, he initially roasts the nuts and then re-hydrates them in water. Here, the nuts develop a roasted flavor and color prior to pressing them. Once re-hydrated, the roasted nuts are pressed using pressures greater than 1,000 psi from about 15 minutes to 2 hours. By contrast, the process of the Present Invention does not initially roast or re-hydrate the nuts prior to pressing.

(6) U.S. Pat. No. 4,466,987 issued to Wilkins, et. al. on Aug. 21, 1984, and assigned to Nabisco, similarly discloses a process where the nuts are pre-roasted prior to pressing. Gannis is a co-inventor. Pressures ranging from 1,000 psi to 1,500 psi are applied for a time ranging from 15 minutes to 2 hours. This is done to impart a pleasant flavor and color to the low fat nuts. Wilkins differs from Holloway in that the step of pre-hydration prior to pressing is absent. Hydration takes place after pressing. By contrast, as with Holloway, the process of the Present Invention does not pre-roast the nuts prior to pressing.

(7) U.S. Pat. No. 4,938,987 issued to Gannis, et. al. on Jul. 3, 1990, and assigned to Nabisco, discloses a process where the nuts are roasted after pressing. However, the nuts are not blanched prior to pressing. Wilkins is a co-inventor.

(8) Another U.S. Pat. No. 5,002,802 issued to Gannis, et. al. (with Wilkins as a co-inventor) on Mar. 26, 1991, and also assigned to Nabisco, discloses a process in which the nuts are initially pressed, and then dry-roasted. Then, while still hot, the nuts are infused with an edible oil to improve the flavor while retaining the low fat content. By contrast, the process of the Present Invention does not infuse the dry hot roasted nuts with oil. Furthermore, reconstitution is not done while roasting the pressed nuts.

(9) U.S. Pat. No. 5,094,874 issued to Zook on Mar. 10, 1992, and also assigned to Nabisco, also discloses a process which infuses the nuts with an edible oil after pressing, reconstituting, and roasting. The pressing times and pressures are the same as for the other Nabisco patents (supra). By contrast, the process of the Present Invention does not infuse the dry hot roasted nuts with oil. In addition, reconstitution is not done while roasting the pressed nuts.

(10) U.S. Pat. No. 5,164,217 issued to Wong, et. al. on Nov. 17, 1992, and assigned to Procter & Gamble, discloses a process whereby food compatible particulate matter less than 1,000 microns in size is added to the nuts during pressing at pressures ranging from 1500 to 7,500 psi. The particulate matter is removed in a subsequent step. In the preferred process, the peanuts are mixed with a peanut oil slurry of salt with a particle size less than 40 microns. The nuts are then pressed at a pressure of 5,200 psi for 10 minutes. By contrast, the process of the Present Invention does not add any particulate material while pressing. In addition, the pressing time is less than one minute. The applied pressure is less then 1,000 psi.

(11) Another patent issued to Zook, et. al. and assigned to Nabisco, viz., U.S. Pat. No. 5,240,726 issued on Aug. 31, 1993, discloses a process wherein the natural fatty nut oil is replaced with a low calorie fat-like material. This material comprises a triglyceride bearing one long chain fatty acid residue and two short chain fatty acid residues. The nuts are first de-fatted using any process such as those disclosed any of the Nabisco patents (supra). By contrast, the process of the Present Invention does not add such low calorie, fat-like or triglyceride materials to the defatted nuts.

(12) U.S. Pat. No. 5,290,578 issued to Passey, et. al. on Mar. 1, 1994 discloses a process that extracts the oil from peanuts using supercritical carbon dioxide. There is a pre-treatment step that comprises humidification and microwaving. Dry ice is used to supply the carbon dioxide to the system. The supercritical carbon dioxide is in a fluid state. This process has the advantage of being a continuous process rather than a batch process. However, the process comprises a 2-hour extraction hold step. Extraction of the oil takes place in several stages. Implementation of this process is complex and costly, and has so far not proven to be commercially viable. Clearly, this is a different process than that of the Present Invention.

(13) Yet another patent was issued to Zook and assigned to Nabisco—U.S. Pat. No. 5,595,780 issued on Jan. 21, 1997. Here, Zook discloses a process whose starting point is a nut that has been defatted using one of the processes previously discussed. Zook then places the nuts under vacuum of at least about 30 inches of Mercury, and infuses the nuts with an edible oil. The process can use the same oil that was previously used to roast the nuts. Reconstitution of the nuts takes place with steam. By contrast, the process of the Present Invention does not infuse the nuts with oil, and no steam is used in the reconstitution step.

(14) U.S. patent application Ser. No. 09/731,296 filed by Hathi on Dec. 6, 2000 and published as Patent Application Publication US 2002/0068122 A1 on Jun. 6, 2002 discloses a process for removing oil from nuts by first grinding the nuts into a powder, then extracting the oil from the milled nuts, and finally remolding the nut powder into the shape of a nut using a mold. Clearly, the Hathi process is completely different from that of the Present Invention, which does not grind or mill the nuts to extract the fats and oils and then remold the powder into the final shape.

(15) International Patent Application Serial No. PCT/US91/00163 filed by Holloway, et. al. on Jan. 8, 1991, assigned to Nabisco, and published as International Publication No. WO 91/10372 on Jul. 25, 1991, discloses a process whereby partially defatted nuts are roasted, and then contacted with a non-digestible or only partially digestible fat-like substance. This low calorie fat-like material can replace fully digestible triglyceride fats or oils in the human diet. The nuts have the characteristics of full-fat nuts without the calories. The partially defatted nuts are first pressed to extract 40-52% of their initial triglyceride fat content at pressures ranging from 1,100 to 1,300 psi, for times of 15 minutes to 2 hours. Reconstitution takes place after the roasting process by contacting the nuts with water. By contrast, the process of the Present Invention does not infuse the nuts with a non-digestible or partially digestible fat-like material, and the press time is less than one-minute. The applied pressure is less then 1,000 psi.

(16) International Patent Application Serial No. PCT/GB93/00371 filed by Zumbe on Feb. 22, 1993, and published as International Publication No. WO 93/16609 on Sep. 3, 1993, discloses a process for producing reduced fat (oil depleted) nuts by use of microwave heating. Zumbe performs this process on raw hazelnuts. First, they are pre-dried and optionally blanched. The nuts are then pressed for an undisclosed period of time. Then, the nuts are reconstituted into their original shape using water almost at the boiling point. A vacuum chamber is used during reconstitution. Next, the nuts are partially dried and then subjected to microwave drying and roasting. By contrast, the process of the Present Invention does not using microwave heating in the defatting step.

Zumbe comments upon Vix and the post-Vix processes as follows: "Unfortunately such reduced fat nuts tend to be smaller than the original nuts from which they were made and also tend to have inferior sensory qualities. In fact, following on from the disclosure by Vix et al, patents on reduced fat nuts have mainly concentrated on methods of improving their flavour. U.S. Pat. No. 3,645,752 and U.S. Pat. No. 3,740,336 to Baxley, U.S. Pat. No. 4,049,833 to Gannis et al and GB-B-2,085,277 to Holloway and Wilkins are examples of such later patents. Thus the issue of size has been given little attention."

(17) Yudi Pranato, Djagal Wiseso Marseno and Haryadi, "Methylcellulose and hydroxyprophyl methylcellulose-based coatings on partially defatted peanut to reduce frying oil uptake and enhance oxidative stability," As. J. Food Ag-Ind., 2009 2(04), 891-900. This article was published in the Asian Journal of Food and Agro-Industry. Here, the authors employed a Vix-type process involving pressing peanuts to remove oil and reconstituting in water to reshape the nuts. However, their process differs from the prior art in their application of an edible coating agent to the nuts prior to frying them in oil. This is done to reduce reabsorption of oil during the frying process and to maintain oxidative stability during storage.

Pranato measured the oil content of raw peanuts as 45.15%, while the Applicants measured this same parameter as high as 52.67%. After mechanical pressing, the oil content of Pranato's nuts decreased to 36.20%. After the frying (or roasting) process, the oil content increased to 43.65%. This is due to the reabsorption of oil into the nut, because the nuts were fried in oil. This is the Control listed in Table 2. In order to avoid this oil reabsorption, Pranato coated his nuts with methylcellulose (MC) and hydroxypropyl methylcellulose (HPMC). The coating process was accomplished by dipping or spraying the nuts with MC or HPMC. Thereafter, the coated nuts were fried in oil. The oil content of Pranato's nuts following processing ranged between 35.25% and 37.48%. The coating sealed the nuts, thereby preventing oil reabsorption. (See Pranato, page 895, and particularly Table 2.) By contrast, the process of the Present Invention produces uncoated nuts. The Present Invention does not use a fortification or coating step to apply coatings such as HC or HPMC. Also, by contrast, the uncoated nuts of the Present Invention have a fat and oil content of 35.6%.

Pranato also measured the hardness of the processed nuts. However, their measurement of hardness was done by determining the force (in Newtons) necessary to break the snack nuts. This is an inappropriate measurement for soft objects. Determination of the force necessary to break the nuts is a useless measurement. It does not address the texture, flakiness, and general feel of the product. The appropriate measurement is done using the Shore Type A Hardness Scale.

There are several scales of durometer, used for materials with different properties. The two most common scales, using slightly different measurement systems, are the ASTM D2240 type A and type D scales. The A scale is for softer objects, while the D scale is for harder ones. A durometer is one of several measures of the hardness of a material. Hardness may be defined as a material's resistance to permanent indentation. The durometer scale was defined by Albert F. Shore, who developed the measurement device in the 1920s. The term durometer is often used to refer to the measurement, as well as the instrument itself. The Shore durometer scale is typically used as a measure of hardness in polymers, elastomers, and rubbers.

While harder snack nuts exhibit less breakage during storage, the hardness measurement is more important for determination of consumer quality. Hardness is also a measurement of the integrity of a snack nut. Harder nuts to not break (or flake) in the mouth. Harder nuts do not have a chalky feel in the mouth because fine particles are not shed from them.
Key Factors Regarding Differences Between the Present Invention and the Prior Art There has been a long-felt unfulfilled need for low-calorie, low-fat snack peanuts since 1933. No low-calorie, low fat snack peanuts are sold currently. This need has been fulfilled by the snack peanuts of the Present Invention. Consumer acceptance has been high.

The process disclosed in the Vix patent forms the basis for most of the processes to produce defatted nuts. However, the snack nuts produced by the Vix process are smaller than their high-calorie counterparts, they lack acceptable flavor, and they are gritty in the mouth. They also lack sufficient hardness to withstand breakage when stored. The snack peanuts of the Present Invention taste very much like their high-calorie counterparts, and they are hard enough to provide an acceptable texture. They do not flake, nor do they have a chalky mouth feel.

The post-Vix patents are produced using a similar process. However, their primary thrust is to improve flavor.

The uncoated snack nuts of the Present Invention have low-oil and high-protein contents AND they have hardness close to that of commercially available snack nuts. When eaten, they are virtually indistinguishable from ordinary snack nuts.

BRIEF DESCRIPTION OF THE DRAWINGS

FIG. 2 is a schematic of the defatting step of the process of the Present Invention.

FIG. 3 is a schematic showing the reconstituting step of the process of the Present Invention.

DETAILED DESCRIPTION OF THE INVENTION

Figure 1:
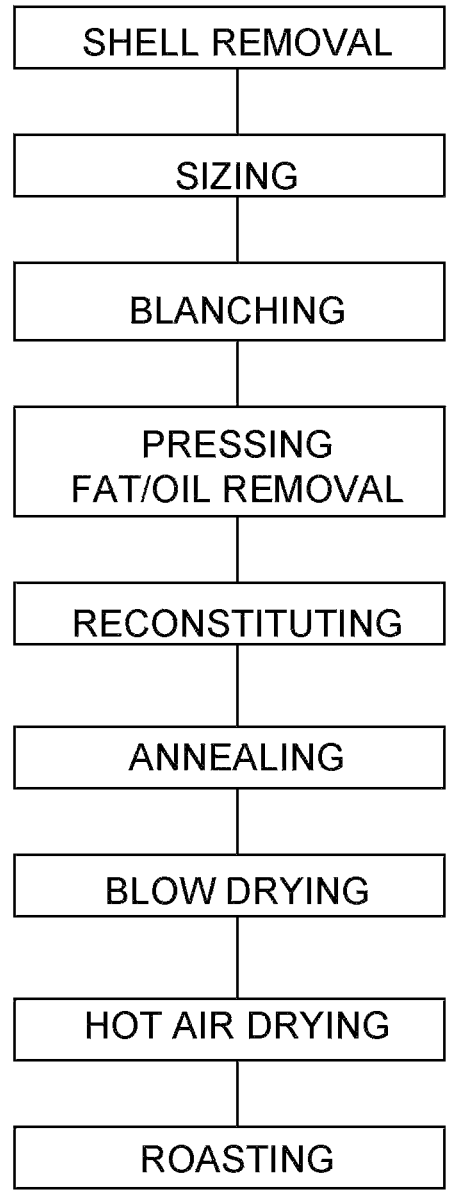
FIG. 1 is a block diagram of the process of the Present Invention.

The Present Invention consists of a process for manufacturing low fat, low calorie snack nuts as well as the snack nut produced by said process. The steps in the process are blocked out in FIG. 1. The sequence of steps generally runs from the top of the drawing to the bottom. However, the order of some of the steps is not critical, and some of the steps are optional.

The process of the Present Invention is useful for manufacturing, inter alia, low fat, low calorie snack peanuts, almonds, cashew nuts, pecans, hazelnuts, Brazil nuts, pine nuts, macadamia nuts, hickory nuts, beechnuts, pistachio nuts, acorns, etc.

Peanut snack nuts manufactured using the process of the Present Invention are presently being marketed under the trade name, Nachalur Natural Nut™. Almonds and cashews made by this process are also being sold. Table 1 below is a nutritional value comparison based upon 100 gm (3.5 oz) of peanuts produced using the process of the Present Invention.

| Nutritional Component | Regular Peanut | Nachalur Natural Nuts ™ |
|---|---|---|
| Energy, kcal | 599 | 449 |
| Fat & Oil, gm | 52.6 | 35.6 |
| Protein, gm | 28.3 | 33.6 |
| Dietary Fiber, gm | 9.6 | 11.3 |
| Carbohydrates, gm | 15.3 | 18.3 |

Referring to FIG. 1, the process steps are as follows:
(1) Shelling

Most nuts, especially peanuts, are harvested with their shells. The first step in the process is to remove the shells. What is extracted from the shell is the nut kernel. This forms the snack nut. A snack nut refers to either an entire kernel or a kernel that is split into two halves.

(2) Sizing

The nut kernels are sized to separate and remove those that are too small or those that are too big.

(3) Blanching

Most nuts have a skin that surrounds the kernel. Blanching is the process whereby the skin is removed. Most consumers prefer peanuts that are blanched. However, many consumers prefer almonds with their dark skin. Therefore, this is an optional step.

(4) Defatting

This is a physical process that extracts the oil from the nut under pressure. Pressing is one method to remove the oil. This is done in a hydraulic press. The nuts may be pressed between two flat plates, or in a rotary press, or in a disk press, etc. Extraction of oil from nuts in a hydraulic press with two flat plates is shown in FIG. 2.

This step is novel in several respects. Instead of dumping a large number of nuts into a press chamber, the Present Invention uses a monolayer of nuts. Referring to FIG. 2, the monolayer of nuts 2 is positioned on the lower plate of hydraulic press 1. A vacuum pump creates a vacuum on the lower plate. This serves two purposes. First, it causes the nuts to remain as a close-packed monolayer on the lower plate. Second, it serves to collect the expelled oil. As the two plates come together, the nuts are squeezed, and the oil is expelled from the nut. The oil is collected along air/oil path 3 into a receptacle 4. Once collected, the nut oil has its own uses, and it can be harvested. For example, peanut oil is often sold for cooking.

It is important to note that pressing is not a grinding or milling process. The product is not powdered nuts. Instead, as a result of the pressing (or defatting) stage, the nut remains as a kernel, but it is deformed or flattened. The yield of snack nuts produced by this process is greater than eighty percent.

Another novel feature of this step is the pressing process itself. Pressing comprises of a plurality of cycles that consist of pressing and releasing. For example, there could be three such cycles during an interval of less than one minute, thereby extracting between 20% and 50% of the oil from the nut. The number of cycles of the plurality is determined by the desired extraction amount. However, there must be at least one cycle. Nonetheless, they all complete in less than one minute. Once the pressing cycles have extracted the desired amount of oil, the vacuum is released, the plates are withdrawn, and the nuts are driven from the press to the next step in the process. Before the plates close again, a new monolayer of nuts enters the press, and the process is repeated. Thus, the press never stops. It runs continuously, thereby increasing the throughput and making the process very economical.

One skilled in the art will recognize that a flat plate hydraulic press can have a plurality of plates, said plurality being more than two. The plurality of plates would be stacked in layers. Each plate could press its own monolayer of nuts, thereby greatly increasing the yield.

FIG. 2 shows a flat plate hydraulic press for illustration purposes only. One skilled in the art will recognize that a flat plate hydraulic press can be replaced with a rotary press or other mechanical means to continuously feed the nuts in a monolayer configuration and apply pressure to expel the oil.

(5) Reconstituting

Because of the pressing step, the nut kernel is compressed and deformed into a flattened shape. In this step, the kernel is reformed into its approximate original shape. This is illustrated in FIG. 3. FIG. 3A represents the original nut kernel; FIG. 3B represents the flattened kernel that was deformed by pressing; and FIG. 3C represents the reformed or reconstituted nut kernel.

A nut kernel resembles a sponge. It is not uniformly solid. Instead, it comprises cells that contain mostly fatty oil and some water, said cells being interspersed within the nutmeat. When a nut is squeezed, the oil and water are expelled from the cells, and the nut deforms. However, a nut kernel is different from a sponge in that it lacks the resilience possessed by a sponge. Therefore, when compressed, a nut kernel remains in its deformed state unless it is reconstituted.

Reconstitution is done by filling the empty cells with water. After the deformed kernels leave the press, they are contacted with hot water bath at a temperature between 176° F. and 212° F. for less than one minute. Water is absorbed in the range of 15 to 45 lbs per hundred pounds of wet weight defatted peanuts after reconstitution, and the shape returns approximately to the original shape of snack peanuts. The hot water contacting medium is presented for illustration purposes only, and one skilled in the art will recognize that the hot water in the reconstitution step can be replaced with an aqueous medium that predominantly contains hot water along with other dissolved edible water-soluble ingredients.

(6) Annealing

Reconstituted nuts are soft and fragile, and they tend to break in handling. A novel step in the process is annealing, which tempers or hardens the nuts. After the reconstitution step, the nuts are contacted with cold water. The temperature of the cold-water bath is between 32° F. and 69° F. This cold hardens the nut kernels in a similar way that metals are annealed after hot working. Hardening the nuts helps to prevent breakage during post-processing, helps to ease handling, and increases the yield of snack nuts. Prior to annealing, the mean hardness of a typical peanut kernel is measured as 27 (+3.2 SD) Shore A with an ASTM D2240 Type A device. After annealing, the mean hardness of a typical peanut kernel is measured as 50 (+5.7 SD) Shore A with an ASTM D2240 Type A device.

Annealing may also be accomplished by contacting the nut kernels with cold air or liquid nitrogen, or by any other chilling method.

(7) Blow Drying

This step involves blowing air at room temperature over the nut kernels in order to remove excess water.

(8) Hot Air Drying

The nut kernels are placed into a hot air convection oven maintained at a temperature between 250° F. and 400° F. This step serves to extract the water from the nut and to bring it to its final shape.

Any other heating means, such as a heat tunnel, may be used to dry the nuts. Drying is performed until the moisture content of the nuts is reduced to approximately 10% of the nut weight.

(9) Roasting

Roasting of the nut kernels is performed by the state-of-the-art process to produce roasted nuts. Roasting is done to produce a pleasing color and flavor. Because the annealing step hardens the uncoated snack nuts, reabsorption of oil into the nut does not occur.

The process of the Present Invention, disclosed supra, is able to produce a defatted uncoated snack peanut comprising a whole or split nut kernel, wherein the snack peanut comprises (on a 100 gm basis):

a) between 20 gm and 38 gm of fat and oil;
b) between 27.5 gm and 35 gm of protein; and
c) between 10 gm and 14 gm of dietary fiber, and having a hardness (Shore Hardness Type A) between 70 HA and 90 HA as measured using a Durometer measurement.

Hardness measurements were made on the snack nuts during the process using the Shore Hardness Type A Durometer scale with the following results.

TABLE 1

Hardness Measurements (HA)

| | Sample ID | | | | | | |
|---|---|---|---|---|---|---|---|
| | #1 | #2 | #3 | #4 | #5 | Avg. | S.D. |
| Raw Peanuts | 75 | 90 | 80 | 70 | 68 | 76.6 | 8.8 |
| Hot Reformed | 22 | 28 | 29 | 30 | 26 | 27.0 | 3.2 |
| Cold Annealed | 54 | 43 | 45 | 56 | 52 | 50.0 | 5.7 |
| Oil Roasted | 74 | 88 | 82 | 85 | 79 | 81.6 | 5.4 |

As may be seen from Table 1, after reconstitution to their original shape, the snack nuts are quite soft. The Vix Process and most post-Vix processes stop there. Upon drying, the nuts lack sufficient hardness. However, in the Present Invention, there is an additional annealing step post reconstitution. Note the difference in hardness between the cold annealed snack peanuts and those having just been reconstituted in hot water. Oil roasting further hardens the nuts to be significantly greater than even raw peanuts. Oil roasting is optional, but it adds flavor. Merely drying the nuts after the annealing process produces uncoated snack nuts with hardness approximating that of raw peanuts. Therefore the hardness of the final product would range between 70 HA and 90 HA (Shore Hardness Type A) using a Durometer measurement.

As discussed above, hardness of the snack peanut is a critical parameter not only to prevent breakage during storage, but also to provide acceptable mouth feel for consumers. While a hardness measurement between 70 HA and 90 HA would be an inherent property of ordinary snack nuts that are commercially available, it is not an inherent property of defatted snack nuts. To the Applicants' knowledge and belief, the uncoated snack nuts produced by the process of the Present Invention are the only defatted snack nuts that have such great hardness.

To produce the uncoated snack peanuts by the Present Invention, the process described in U.S. Pat. No. 8,445,054 is used, except that the fortification step is eliminated.

The above disclosure teaches a process that produces reduced fat, low calorie, high fiber, and high protein roasted nuts. The nuts have texture, taste, aroma, and a physical appearance closely approximating that of natural nuts. The shelf life is improved relative to the prior art processes. The prior art, especially the Nabisco patents, attempted to manufacture nuts of this type by various processes with some measure of technological success, but with no commercial success. The nuts produced using this process have sold very well. Consumer acceptance is high. Manufacturing facilities are currently expanding to meet the increased demand.

NOTES REGARDING THE CLAIMS

When reciting what the Applicants regard as their invention, they intend to act as their own lexicographers. The term uncoated snack peanut refers to a shelled and blanched whole or split peanut kernel having no external coating materials applied to them during processing. Coating materials include, but are not limited to natural or synthetic edible materials. Examples of such coating materials include, but are not limited to starch, methyl cellulose (MC), hydroxyl-propyl methyl cellulose (HPMC—commonly used in drug tablets), carboxy-methyl cellulose (CMC), gelatin, etc.

Furthermore, the preamble of each claim refers to an uncoated snack peanut comprising a whole or split nut kernel that is defatted, reconstituted, and dried. The Applicants intend the preamble of every claim to limit the scope of the claim, and intend all claims to be construed with their preambles as claim limitations.

We claim:

1. An uncoated snack peanut comprising a whole or split nut kernel that is defatted, reconstituted, and dried, said snack peanut comprising:
    a) between 20 gm and 38 gm of fat and oil on a 100 gm basis; and
    b) having a hardness (Shore Hardness Type A) between 80 HA and 90 HA, as measured using a Durometer measurement.

2. The uncoated defatted snack peanut of claim 1 wherein the peanut comprises between 35 gm and 36 gm of fat and oil on a 100 gm basis.

3. The uncoated defatted snack peanut of claim 1 further comprising between 27.5 gm and 35 gm of protein on a 100 gm basis.

4. The uncoated defatted snack peanut of claim 3 further comprising between 10 gm and 14 gm of dietary fiber on a 100 gm basis.

5. The uncoated defatted snack peanut of claim 2 further comprising between 27.5 gm and 35 gm of protein on a 100 gm basis.

6. The uncoated defatted snack peanut of claim 5 further comprising between 10 gm and 14 gm of dietary fiber on a 100 gm basis.

* * * * *